(12) United States Patent
Kawashima et al.

(10) Patent No.: US 8,278,404 B2
(45) Date of Patent: Oct. 2, 2012

(54) PROCESS FOR PRODUCING COPOLYMER

(75) Inventors: Jun Kawashima, Ichihara (JP);
Katsunari Inagaki, Ichihara (JP);
Tatsuo Sassa, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/114,577

(22) Filed: May 24, 2011

(65) Prior Publication Data

US 2011/0224390 A1    Sep. 15, 2011

Related U.S. Application Data

(60) Continuation of application No. 11/562,812, filed on Nov. 22, 2006, now abandoned, and a division of application No. 10/885,760, filed on Jul. 8, 2004, now Pat. No. 7,262,258.

(30) Foreign Application Priority Data

Jul. 16, 2003    (JP) ................................ 2003-197749

(51) Int. Cl.
*C08F 4/622*    (2006.01)
*C08F 4/68*    (2006.01)

(52) U.S. Cl. ........ 526/144; 526/142; 526/168; 526/172; 526/348

(58) Field of Classification Search ............... 526/142, 526/144, 172, 348, 168
See application file for complete search history.

(56) References Cited

U.S. PATENT DOCUMENTS

| 3,645,992 A | 2/1972 | Elston |
| 3,838,137 A | 9/1974 | Tang |
| 5,527,951 A | 6/1996 | Khan et al. |
| 5,728,911 A | 3/1998 | Hall |
| 5,786,504 A | 7/1998 | Nudenberg et al. |

FOREIGN PATENT DOCUMENTS

| EP | 0 134 079 A2 | 6/1984 |
| EP | 0134 080 A2 | 6/1984 |
| JP | 46-21212 B | 6/1971 |
| JP | 47-23413 B | 6/1972 |
| JP | 59-130226 A | 7/1984 |
| JP | 07-48412 A | 2/1995 |
| JP | 09-502464 A | 3/1997 |
| WO | 97/43243 | 11/1997 |

*Primary Examiner* — Caixia Lu
(74) *Attorney, Agent, or Firm* — Sughrue Mion, PLLC

(57) ABSTRACT

There are provided (I) a process for producing a copolymer of ethylene, an α-olefin having from 3 to 20 carbon atoms and optionally a polyene, which comprises the step of copolymerizing those monomers in a polymerization reactor by feeding the following components (A), (B), (C1) and (D) to the polymerization reactor:
(A) a transition metal complex,
(B) an organic aluminum compound,
(C1) a halogen-containing compound, and
(D) a Lewis base,
wherein those components are fed to the polymerization reactor without a preliminary contact of (1) the component (A) with the component (B), (2) the component (A) with the component (C1), (3) the component (B) with the component (C1), and (4) the component (B) with the component (D); and (II) a process for producing said copolymer, which comprises the step of copolymerizing those monomers in a polymerization reactor (i) by feeding to the polymerization reactor the components (A), (B), (D), (C2) a halogen-containing compound, which is a derivative of an aryl group-containing carboxylic acid, and (C3) a halogen-containing compound, which is not a derivative of a carboxylic acid, or (ii) by feeding thereto the components (A), (B), (D), (C3), and (C4) a halogen-containing compound, which is a derivative of a carboxylic acid containing an unsaturated bond-carrying linear organic group.

6 Claims, No Drawings

PROCESS FOR PRODUCING COPOLYMER

This application is a continuation of pending prior application Ser. No. 11/562,812 filed Nov. 22, 2006, which is a divisional of application Ser. No. 10/885,760 filed Jul. 8, 2004, which claims benefit of priority from Japanese Patent Application No. 2003-197749, filed Jul. 16, 2003. The entire disclosures of the prior applications are hereby incorporated by reference.

FIELD OF THE INVENTION

The present invention relates to a process for producing a copolymer of ethylene, an α-olefin having from 3 to 20 carbon atoms and optionally a polyene.

BACKGROUND OF THE INVENTION

An ethylene-α-olefin-non-conjugated diene copolymer has hitherto been produced with a homogeneous vanadium catalyst (for example, JP 46-21212B).

There is also known a process for producing a branched chain-containing ethylene-α-olefin copolymer using a combination of the above-mentioned vanadium catalyst with a component functioning as a Lewis base (for example, JP 47-23413B).

There is further known a polymerization process, wherein an organic aluminum compound, a vanadium compound, a halogenated hydrocarbon and a component functioning as a Lewis base are supplied to a polymerization reactor without preliminary contact of (1) the organic aluminum compound and the vanadium compound, (2) the organic aluminum compound and the halogenated hydrocarbon, or (3) the organic aluminum compound, the vanadium compound and the halogenated hydrocarbon (for example, JP 07-048412A).

SUMMARY OF THE INVENTION

However, the above-mentioned homogeneous vanadium catalyst is generally apt to be inactivated extremely during polymerization, and therefore, its catalytic activity is not very high at practical polymerization temperature. Each catalyst disclosed in the above-mentioned latter two patent documents is also insufficient in its activity.

Incidentally, when feeding many kinds of catalyst components to a polymerization reactor through limited numbers of feeding nozzles, it is preferable to feed to the polymerization reactor a pre-mixture of at least two kinds of the catalyst components. However, said pre-mixture may lower activity of the obtained catalyst depending upon a combination of the catalyst components, and therefore, it is important to make a balance between said combination and catalyst activity. In the present invention, the term "catalyst activity" means an amount of a copolymer produced per unit amount of a catalyst.

An object of the present invention is to provide a process for producing a copolymer (particularly, random copolymer) of ethylene, an α-olefin having from 3 to 20 carbon atoms and optionally a polyene in the presence of a high activity-carrying catalyst.

The present invention is a process for producing a copolymer of ethylene, an α-olefin having from 3 to 20 carbon atoms and optionally a polyene, which comprises the step of copolymerizing in a polymerization reactor ethylene, the α-olefin having from 3 to 20 carbon atoms and optionally the polyene by feeding to the polymerization reactor:
 (A) a transition metal complex,
 (B) an organic aluminum compound,
 (C1) a halogen-containing compound, and
 (D) a Lewis base,
wherein the transition metal complex (A), the organic aluminum compound (B), the halogen-containing compound (C1) and the Lewis base (D) are fed to the polymerization reactor without a preliminary contact of (1) the transition metal complex (A) with the organic aluminum compound (B), (2) the transition metal complex (A) with the halogen-containing compound (C1), (3) the organic aluminum compound (B) with the halogen-containing compound (C1), and (4) the organic aluminum compound (B) with the Lewis base (D). This process is hereinafter referred to as "process-1".

The present invention is also a process for producing a copolymer of ethylene, an α-olefin having from 3 to 20 carbon atoms and optionally a polyene, which comprises the step of copolymerizing in a polymerization reactor ethylene, the α-olefin having from 3 to 20 carbon atoms and optionally the polyene by feeding to the polymerization reactor:
 (A) a transition metal complex,
 (B) an organic aluminum compound,
 (C2) a halogen-containing compound, which is a derivative of an aryl group-containing carboxylic acid,
 (C3) a halogen-containing compound, which is not a derivative of a carboxylic acid, and
 (D) a Lewis base.
This process is hereinafter referred to as "process-2".

The present invention is further a process for producing a copolymer of ethylene, an α-olefin having from 3 to 20 carbon atoms and optionally a polyene, which comprises the step of copolymerizing in a polymerization reactor ethylene, the α-olefin having from 3 to 20 carbon atoms and optionally the polyene by feeding to the polymerization reactor:
 (A) a transition metal complex,
 (B) an organic aluminum compound,
 (C4) a halogen-containing compound, which is a derivative of a carboxylic acid containing an unsaturated bond-carrying linear organic group,
 (C3) a halogen-containing compound, which is not a derivative of a carboxylic acid, and
 (D) a Lewis base.
This process is hereinafter referred to as "process-3".

The above-mentioned (A) transition metal complex; (B) organic aluminum compound; (C1) halogen-containing compound; (C2) halogen-containing compound, which is a derivative of an aryl group-containing carboxylic acid; (C3) halogen-containing compound, which is not a derivative of a carboxylic acid; (C4) halogen-containing compound, which is a derivative of a carboxylic acid containing an unsaturated bond-carrying linear organic group; and (D) Lewis base are referred to as "component (A)", "component (B)", "component (C1)", "component (C2)", "component (C3)", "component (C4)" and "component (D)", respectively.

DETAILED DESCRIPTION OF THE INVENTION

Examples of the α-olefin having from 3 to 20 carbon atoms used in the present invention are a linear olefin such as propylene, 1-butene, 1-pentene, 1-hexene, 1-heptene, 1-octene, 1-nonene and 1-decene; a branched olefin such as 3-methyl-1-butene, 3-methyl-1-pentene and 4-methyl-1-pentene; and vinylcyclohexane. These α-olefins may be used singly or in combination of two or more thereof. Among them, propylene or 1-butene is preferable, and propylene is particularly preferable.

The polyene used in the present invention is not particularly limited in its kind. Examples of the polyene are a linear non-conjugated polyene, a cyclic non-conjugated polyene and a conjugated polyene. Specific examples of the polyene are 1,4-hexadiene, 1,5-hexadiene, 1,5-heptadiene, 1,6-heptadiene, 1,6-octadiene, 1,7-octadiene, 1,7-nonadiene, 1,8-nonadiene, 1,8-decadiene, 1,9-decadiene, 1,12-tetradecadiene, 1,13-tetradecadiene, 3-methyl-1,4-hexadiene, 3-methyl-1,5-hexadiene, 3-ethyl-1,4-hexadiene, 3-ethyl-1,5-hexadiene, 3,3-dimethyl-1,4-hexadiene, 3,3-dimethyl-1,5-hexadiene, 5-ethylidene-2-norbornene, 5-propylidene-2-norbornene, 5-vinyl-2-norbornene, 2,5-norbornadiene, 7-methyl-2,5-norbornadiene, 7-ethyl-2,5-norbornadiene, 7-propyl-2,5-norbornadiene, 7-butyl-2,5-norbornadiene, 7-pentyl-2,5-norbornadiene, 7-hexyl-2,5-norbornadiene, 7,7-dimethyl-2,5-norbornadiene, 7,7-methylethyl-2,5-norbornadiene, 7-chloro-2,5-norbornadiene, 7-bromo-2,5-norbornadiene, 7-fluoro-2,5-norbornadiene, 7,7-dichloro-2,5-norbornadiene, 1-methyl-2,5-norbornadiene, 1-ethyl-2,5-norbornadiene, 1-propyl-2,5-norbornadiene, 1-butyl-2,5-norbornadiene, 1-chloro-2,5-norbornadiene, 1-bromo-2,5-norbornadiene, 1,3-butadiene, isoprene, 1,3-pentadiene (piperine), 2,3-dimethyl-1,3-butadiene, and 1,3-hexadiene. Further, cyclic dienes having the following respective structures can also be exemplified.

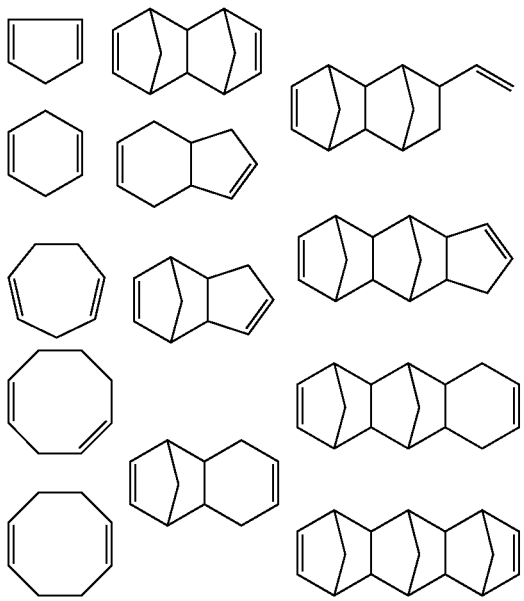

These polyenes may be used singly or in combination of two or more thereof. Among them, preferred is 5-ethylidene-2-norbornene, dicyclopentadiene or 1,4-hexadiene, which are often used in an industrial production of EPDM in view of easy availability.

The component (A) in the present invention is preferably a salt of each metal of the groups IV to VII in the periodic table, which salt is generally used as a Ziegler-Natta catalyst.

The most suitable component (A) is a vanadium compound represented by the following formula (1) or (2):

$$VO(OR)_a Cl_{3-a} \quad (1)$$

$$VX_b \quad (2)$$

wherein R in the formula (1) is a hydrocarbon group, and "a" therein is a number satisfying $0 \leq a \leq 3$; and X in the formula (2) is a halogen atom or an oxygen-containing compound capable of being a ligand, and "b" therein is 3 or 4.

The hydrocarbon group of R in the formula (1) means a linear or branched hydrocarbon group having 1 to 20 carbon atoms. Examples thereof are a methyl group, an ethyl group, a n-propyl group, an i-propyl group, a n-butyl group, an i-butyl group, a t-butyl group, a hexyl group, an octyl group, a nonyl group and a decyl group. Among them, preferred is an ethyl group or an i-propyl group.

Examples of the halogen atom of X in the formula (2) are a chlorine atom and a bromine atom. The oxygen-containing compound capable of being a ligand of X in the formula (2) means a compound containing two carbonyl groups linked together through one carbon atom, wherein two oxygen atoms (one oxygen atom thereof is an oxygen atom of the carbonyl group) can conjugate through a carbon-carbon double bond when said compound functions as a ligand. Examples of said compound are acetylacetone and benzoylacetone.

As the vanadium compound represented by the formula (1) or (2), there is generally used a 3, 4 or 5 valent-vanadium compound soluble in an inactive solvent. Among them, preferred is a halide of vanadium, a chelate complex of vanadium with an oxygen-containing compound, an oxyhalide of vanadium, or a vanadic acid ester. Examples of the vanadium compound are vanadium trichloride ($VCl_3$), vanadium tribromide ($VBr_3$), vanadium tetrachloride ($VCl_4$), vanadium tetrabromide ($VBr_4$), vanadium trisacetylacetonate ($V(acac)_3$), vanadium oxytrichloride ($VOCl_3$), vanadium oxytriethoxide ($VO(OEt)_3$), vanadium oxytriisopropoxide ($VO(Oi-Pr)_3$) and vanadium oxytributoxide ($VO(On-Bu)_3$). Among them, preferred is vanadium oxytrichloride ($VOCl_3$), vanadium oxytriethoxide ($VO(OEt)_3$) or vanadium oxytriisopropoxide ($VO(Oi-Pr)_3$).

When using the vanadium compound represented by the above-mentioned formula (1) or (2), a homogeneous solution polymerization can be carried out more easily, and there can be produced a copolymer having a narrower molecular weight distribution.

The component (B) in the present invention is preferably an aluminum compound containing a hydrocarbon group, which compound is generally used as a co-catalyst of a Ziegler-Natta catalyst.

The most suitable component (B) is an organic aluminum compound represented by the following formula (3):

$$E_a AlZ_{3-a} \quad (3)$$

wherein E is a hydrocarbon group; Z is a hydrogen atom or a halogen atom; and "a" is a number satisfying $0 \leq a \leq 3$.

As the hydrocarbon group of E in the formula (3), a hydrocarbon group having from 1 to 8 carbon atoms is preferable, and an alky group is more preferable. Examples of the hydrocarbon group are a methyl group, an ethyl group, an isopropyl group, a butyl group, an isobutyl group and a hexyl group.

Examples of the halogen atom of Z in the formula (3) are a chlorine atom and a bromine atom.

Examples of the organic aluminum compound represented by the above-mentioned following formula (3) are a trialkylaluminum such as trimethylaluminum, triethylaluminum, tripropylaluminum, triisobutylaluminum and trihexylaluminum; a dialkylaluminum chloride such as dimethylaluminum chloride, diethylaluminum chloride, dipropylaluminum chloride, diisobutylaluminum chloride and dihexyaluminum chloride; an alkylaluminum dichloride such as methylaluminum dichloride, ethylaluminum dichloride, propylaluminum dichloride, isobutylaluminum dichloride and hexylaluminum dichloride; an alkylaluminum sesquichloride such as ethylaluminum sesquichloride; and a dialkylaluminum hydride such as dimethylaluminum hydride, diethylaluminum hydride, dipropylaluminum hydride, diisobutylaluminum hydride and dihexylaluminum hydride. Among them, a chlorine-containing aluminum compound is preferable, and ethylaluminum sesquichloride is more preferable.

The component (C1) in the present invention is preferably a halogen-containing compound, wherein the halogen atom is linked (i) to a π electron-carrying carbon atom, or (ii) to a carbon atom linked to a π electron-carrying carbon atom.

Examples of the component (C1) are compounds represented by the following respective formulas:

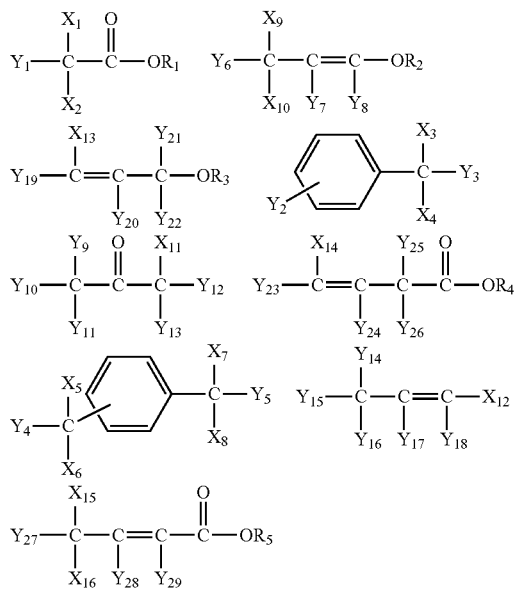

wherein each of $X_1$-$X_{16}$ is independently of each other a halogen atom such as a fluorine atom, a chlorine atom, a bromine atom and an iodine atom, and preferably a chlorine atom or a bromine atom; each of $Y_1$-$Y_{29}$ is independently of each other a halogen atom such as a fluorine atom, a chlorine atom, a bromine atom and an iodine atom, a hydrogen atom or a 1 to 20 carbon atom-containing organic group having no active hydrogen such as an alky group, a phenyl group and a methoxy group; and each of $R_1$-$R_5$ is independently of each other is a 1 to 20 carbon atom-containing organic group having no active hydrogen such as an active hydrogen contained in an amino group, a hydroxyl group or a carboxyl group.

Examples of compounds represented by the above-mentioned formulas are benzotrichloride, p-chloro-benzotrichloride, hexachloro-m-xylene, hexachloro-p-xylene, hexachloroacetone, hexachloropropene, hexachlorobutadiene, methyl trichloroacetate and ethyl trichloroacetate. Among them, preferred is benzotrichloride, p-chloro-benzotrichloride, hexachloro-m-xylene or hexachloro-p-xylene, each of which compounds contains a chlorine atom linked to an α-positioned carbon atom of its aromatic ring; and more preferred is hexachloro-m-xylene. These compounds may be used singly or in combination of two or more thereof.

The component (C2) in the present invention is preferably a halogen-containing compound, which is a derivative of an aryl group-containing carboxylic acid, wherein the halogen atom is linked to a carbon atom linked to both a carbonyl group and the aryl group.

A preferable example of the component (C2) is a compound represented by the following formula (4),

wherein A is an aryl group; $X_A$ is a halogen atom; Y is a halogen atom, a hydrogen atom or a substituent group having no active hydrogen; and $Z_A$ is a halogen atom, an alkoxy group, a hydroxyl group or an amino group. When A is a phenyl group, its aromatic ring may contain at least one halogen atom or alky group as a substituent group. Said A may be a heterocyclic group such as a thienyl group, a furyl group, a pyrrolyl group, an N-alkylpyrrolyl group and a pyridyl group. Examples of the halogen atom of $X_A$ are a fluorine atom, a chlorine atom, a bromine atom and an iodine atom. Among them, preferred is a chlorine atom or a bromine atom, and particularly preferred is a chlorine atom. Examples of the substituent group having no active hydrogen of Y are an alkyl group, a phenyl group and a methoxy group.

Examples of the component (C2) are ethyl chlorophenylacetate, ethyl dichlorophenylacetate, propyl chlorophenylacetate, propyl dichlorophenylacetate, butyl chlorophenylacetate, butyl dichlorophenylacetate, ethyl bromophenylacetate, ethyl dibromophenylacetate, propyl bromophenylacetate, propyl dibromophenylacetate, butyl bromophenylacetate, butyl dibromophenylacetate, methoxyethyl chlorophenylacetate, methoxyethyl dichlorophenylacetate, methoxyethyl bromophenylacetate, methoxyethyl dibromophenylacetate, methyl chlorodiphenylacetate, ethyl chlorodiphenylacetate, ethyl bromodiphenylacetate, and butyl bromodiphenylacetate. Among them, preferred is a compound having two halogen atoms on an α-positioned carbon atom of a carbonyl group, and more preferred is ethyl dichlorophenylacetate.

The component (C3) in the present invention is preferably a halogen-containing compound, which is not a derivative of a carboxylic acid, and which (i) belongs to the above-mentioned component (C1), and (ii) does not have a bond between a hetero atom and a carbon atom of a carbonyl group.

Examples of the component (C3) are compounds represented by the following respective formulas,

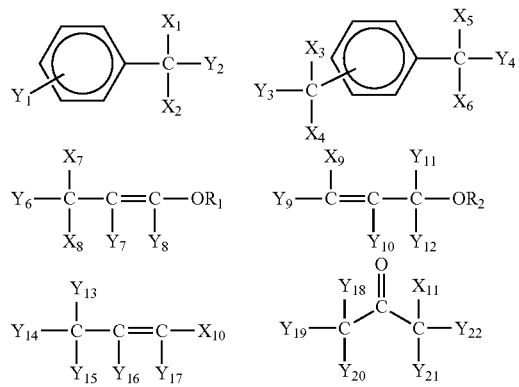

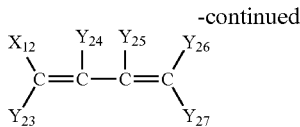

wherein each of $X_1$ to $X_{12}$ is independently of each other a halogen atom, and preferably a chlorine atom or a bromine atom; each of $Y_1$ to $Y_{27}$ is independently of each other a halogen atom, a hydrogen atom or a substituent group having no active hydrogen such as an alkyl group, a phenyl group and a methoxy group; and each of $R_1$ and $R_2$ is independently of each other a 1 to 20 carbon atom-containing organic group having no active hydrogen such as an active hydrogen contained in an amino group, a hydroxyl group or a carboxyl group.

Examples of the component (C3) are benzotrichloride, p-chloro-benzotrichloride, hexachloro-m-xylene, hexachloro-p-xylene, hexachloroacetone, hexachloropropene and hexachlorobutadiene. Among them, preferred is benzotrichloride, p-chloro-benzotrichloride, hexachloro-m-xylene or hexachloro-p-xylene, each of which compounds contains a chlorine atom linked to an α-positioned carbon atom of its aromatic ring; and more preferred is hexachloro-m-xylene.

The component (C4) in the present invention is preferably a halogen-containing compound, which is a derivative of a carboxylic acid containing an unsaturated bond-carrying linear organic group, wherein (i) the unsaturated bond is a carbon-carbon double bond, and (ii) a halogenated alkenyl group is linked to a carbon atom of a carbonyl group.

Examples of the component (C4) are compounds represented by the following respective formulas (5) and (6),

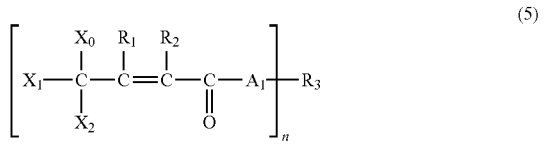

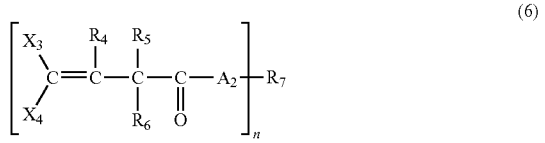

wherein each of $A_1$ and $A_2$ is an oxygen atom, a sulfur atom or a halogen atom, and when each of $A_1$ and $A_2$ is a halogen atom, each of $R_3$ and $R_7$ does not exist; each of $X_0$ to $X_4$ is a halogen atom; each of $R_1$, $R_2$ and $R_4$ to $R_6$ is a halogen atom, a hydrogen atom or an organic group having no active hydrogen; each of $R_3$ and $R_7$ is a hydrogen atom (when n is 1) or a hydrocarbon group containing a substituent group having no active hydrogen; and n is a number of from 1 to 4.

Examples of the component (C4) are butyl-4,4,4-trichlorobut-2-enoate, ethyl-4,4,4-trichlorobut-2-enoate, 2-ethylhexyl-4,4,4-trichlorobut-2-enoate, methyl-4,4,4-trichlorobut-2-enoate, butyl-2-methyl-4,4,4-trichlorobut-2-enoate, methyl-2-methyl-4,4,4-trichlorobut-2-enoate, butyl-2-methyl-2,4,4-trichlorobut-3-enoate, methyl-2-methyl-2,4,4-trichlorobut-3-enoate, butyl-2,4,4-trichlorobut-3-enoate, ethyl-2,4,4-trichlorobut-3-enoate, 2-ethylhexyl-2,4,4-trichlorobut-3-enoate, methyl-2,4,4-trichlorobut-3-enoate and butyl perchlorocrotonate. Among them, preferred is butyl-2-methyl-4,4,4-trichlorobut-2-enoate, butyl-2-methyl-2,4,4-trichlorobut-3-enoate or butyl perchlorocrotonate.

The component (D) in the present invention means a compound functioning as a Lewis base in the present invention. Examples of the component (D) are an ester compound, an ether compound and an amine compound.

Specific examples of the Lewis base are ethyl acetate, propyl acetate, butyl acetate, hexyl acetate, octyl acetate, ethyl acrylate, butyl acrylate, ethyl caproate, butyl caproate, ethyl caprylate, butyl caprylate, ethyl caprate, butyl caprate, ethyl benzoate, butyl benzoate, diethyl adipate, dibutyl adipate, dihexy adipate, triethylamine, tripropylamine, tributylamine, trihexylamine, N,N,N',N'-tetramethyl-1,4-diaminobutane, N,N,N',N'-tetraethyl-1,4-diaminobutane, aniline, dimethylaniline, dimethyl ether, diethyl ether, dibutyl ether, tetrahydrofuran, 1,2-diethoxyethane, 1,4-dioxane, acetone, methyl ethyl ketone, methyl isobutyl ketone, cyclopentanone, cyclohexanone and cyclohaxane-1,4-dione. Among them, preferred is ethyl acetate, hexyl acetate, diethyl adipate, cyclohexanone or 1,4-dioxane, and more preferred is ethyl acetate or diethyl adipate. The above-mentioned compounds may be used singly or in combination of two or more thereof.

In the process-1, the component (A), the component (B), the component (C1) and the component (D) are fed to a polymerization reactor without a preliminary contact of (1) the component (A) with the component (B), (2) the component (A) with the component (C1), (3) the component (B) with the component (C1), and (4) the component (B) with the component (D). Said feeding without a preliminary contact results in a high catalytic activity.

In the process-1, the components (A), (B), (C1) and (D) are used in a molar ratio of generally (A)/(B)/(C1)/(D)=1/2-30,000/0.1-10,000/0.1-10,000, preferably 1/2-200/1-1,000/1-1,000, and further preferably 1/2-50/2-20/2-20, wherein (A), (B), (C1) and (D) in the molar ratio of (A)/(B)/(C1)/(D) mean respective amounts of the components (A), (B), (C1) and (D) used. When each of (C1) and (D) is more than (B), the catalytic activity is lowered, and therefore, each of a molar ratio of (B)/(C1) and a molar ratio of (B)/(D) is preferably 1 or more. When the component (D) is not used, or (D) is less than (C1), the catalytic activity may be lowered.

In the process-2, the components (A), (B), (C2), (C3) and (D) are used in a molar ratio of generally (A)/(B)/(C2)/(C3)/(D)=1/2-30,000/0.1-10,000/0.1-10,000/0.1-10,000, preferably 1/2-2,000/1-1,000/1-1,000/1-1,000, and further preferably 1/2-200/1-20/1-20/1-20, wherein (A), (B), (C2), (C3) and (D) in the molar ratio of (A)/(B)/(C2)/(C3)/(D) mean respective amounts of the components (A), (B), (C2), (C3) and (D) used. When each of (C2), (C3) and (D) is more than (B), the catalytic activity is lowered, and therefore, each of a molar ratio of (B)/(C2), a molar ratio of (B)/(C3) and a molar ratio of (B)/(D) is preferably 1 or more. When the component (D) is not used, or (D) is less than (C2) or (C3), the catalytic activity may be lowered. In the process-2, the combined use of the component (C2) with the component (C3) results in a high catalytic activity.

In the process-3, the components (A), (B), (C4), (C3) and (D) are used in a molar ratio of generally (A)/(B)/(C4)/(C3)/(D)=1/2-30,000/0.1-10,000/0.1-10,000/0.1-10,000, preferably 1/2-2,000/1-1,000/1-1,000/1-1,000, and further preferably 1/2-200/1-20/1-20/1-20, wherein (A), (B), (C4), (C3) and (D) in the molar ratio of (A)/(B)/(C4)/(C3)/(D) mean respective amounts of the components (A), (B), (C4), (C3) and (D) used. When each of (C4), (C3) and (D) is more than (B), the catalytic activity is lowered, and therefore, each of a molar ratio of (B)/(C4), a molar ratio of (B)/(C3) and a molar ratio of (B)/(D) is preferably 1 or more. When the component (D) is not used, or (D) is less than (C4) or (C3), the catalytic activity may be lowered. In the process-3, the combined use of the component (C4) with the component (C3) results in a high catalytic activity.

When using the components (A), (B), (C1)-(C4) and (D) as a solution dissolved in the below-mentioned solvent, or as a suspension suspended therein, concentration of the solution or the suspension may be determined depending upon a feeder thereof to a polymerization reactor.

In case of the process-1, preferable concentration of the component (A) is generally from 0.001 to 0.5 μmol/g-solution or suspension; preferable concentration of the component (B) is generally from 0.01 to 100 μmol/g-solution or suspension; preferable concentration of the component (C1) is generally from 0.001 to 10 μmol/g-solution or suspension; and preferable concentration of the component (D) is generally from 0.001 to 10 μmol/g-solution or suspension.

In case of the process-2, preferable concentration of the component (A) is generally from 0.001 to 0.5 μmol/g-solution or suspension; preferable concentration of the component (B) is generally from 0.01 to 200 μmol/g-solution or suspension; preferable concentration of the component (C2) is generally from 0.001 to 10 μmol/g-solution or suspension; preferable concentration of the component (C3) is generally from 0.001 to 10 μmol/g-solution or suspension; and preferable concentration of the component (D) is generally from 0.001 to 10 μmol/g-solution or suspension.

In case of the process-3, preferable concentration of the component (A) is generally from 0.001 to 1.0 μmol/g-solution or suspension; preferable concentration of the component (B) is generally from 0.01 to 200 μmol/g-solution or suspension; preferable concentration of the component (C4) is generally from 0.001 to 10 μmol/g-solution or suspension; preferable concentration of the component (C3) is generally from 0.001 to 10 μmol/g-solution or suspension; and preferable concentration of the component (D) is generally from 0.001 to 10 μmol/g-solution or suspension.

A preferable copolymerization method in the present invention is a solution polymerization using, as a solvent, an aliphatic hydrocarbon such as butane, pentane, hexane, heptane and octane; an aromatic hydrocarbon such as benzene and toluene; or a halogenated hydrocarbon such as methylene dichloride. Among them, preferred is an aliphatic hydrocarbon such as hexane, heptane and octane.

Polymerization temperature is generally from −50 to 250° C., and particularly preferably from 20 to 70° C. Polymerization pressure is not particularly limited, and preferably from atmospheric pressure to 10 MPa. Polymerization time may be determined depending upon the kind of a catalyst or polymerization reactor used, and is generally from 1 minute to 20 hours. A chain transfer agent such as hydrogen may be used in order to control a molecular weight of an obtained copolymer.

Preferable copolymerization conditions in the present invention are as follows:

(1) a polymerization method is a solution polymerization method, (2) polymerization temperature is from 20 to 70° C., (3) a residence time in a polymerization reactor is from 5 to 120 minutes, and (4) polymerization pressure in the polymerization reactor is from atmospheric pressure to 10 MPa.

A ratio by weight of an ethylene unit contained in a copolymer produced according to the process of the present invention to an α-olefin unit contained therein is preferably from 90/10 to 30/70, and more preferably from 70/30 to 40/60, wherein the total of both units is 100 by weight. When said ratio is higher than 90/10, the obtained copolymer is insufficient in its rubber elasticity, and as a result, said copolymer may not be fit for practical use. When said ratio is lower than 30/70, the obtained copolymer is insufficient in its strength. In the present invention, a term such as the term "ethylene unit" means a polymerized monomer unit such as a polymerized ethylene unit.

An iodine value of a copolymer obtained according to the process of the present invention is preferably from 1 to 40 g/100 g-copolymer. When said iodine value is higher than 40 g/100 g-copolymer, the obtained copolymer may be inferior in its weatherability.

Representative examples of use of the copolymer produced by the process according to the present invention are materials for automobiles, constructions, industries and electric wires.

EXAMPLE

The present invention is explained with reference to the following Examples, which are not intended to limit the scope of the present invention.

Properties of the obtained copolymers were measured according to the following methods.

1. Content of Propylene Unit (% by Weight)

It was measured by a method comprising the steps of:

(1) making an about 0.1 mm-thick film of each of standard reference (co)polymers and the copolymer, using a hot-press machine, wherein the standard reference (co)polymers mean (i) polypropylene, (ii) polyethylene and (iii) an ethylene-propylene copolymer (an ethylene unit content=50% by weight and a propylene unit content=50% by weight), (2) measuring an infrared adsorption spectrum of each film three times with an infrared spectrometer, IR-810, manufactured by JASCO Corporation, (3) obtaining transmittance of an adsorption peak at 1154 cm$^{-1}$ (methyl branch) of each infrared adsorption spectrum according to "Characterization of Polyethylene by Infrared Adsorption Spectrum" written by Takayama and Usami et al, or Die Makromolekulare Chemie, 177, 461 (1976) written by Mc Rae, M. A. and MadamS, W. F. et al, (4) averaging three values, and assigning the average value to a measured value, and (5) comparing the measured value of the copolymer with those of standard reference (co)polymers, thereby obtaining a content of propylene unit thereof.

2. Iodine Value

It was measured by a method comprising the steps of:

(1) making a 0.5 mm-thick film of the copolymer using a hot-press machine, (2) measuring an infrared adsorption spectrum of the film with the above-mentioned infrared spectrometer, (3) obtaining transmittance of a peak at 1610 cm$^{-1}$ derived from a dicyclopentadiene unit of said infrared adsorption spectrum, and that of a peak at 1687 cm$^{-1}$ derived from a 5-ethylidene-2-norbornene unit thereof, respectively, (4) calculating a molar content of a double bond contained in the copolymer from said transmittance, and (5) converting said molar content to an iodine value.

3. Molecular Weight and Molecular Weight Distribution

Using a solution of about 5 mg of the copolymer dissolved in 5 ml of o-dichlorobenzene, it was measured according to a gel permeation chromatography (GPC) under the following conditions:

(1) an apparatus, a trade name of 150C/GPC, manufactured by Waters Co., was used as a GPC apparatus,
(2) a column, a trade name of SODEX PACKED COLUMN A-80M, manufactured by Showa Denko K.K., was used as a column,
(3) 400 micro-litters of the above-mentioned solution was injected,
(4) an elution temperature was adjusted to 140° C.,
(5) a flow rate of the solution eluted was controlled to 1.0 ml/min,
(6) a refractivity detector was used as a detector,
(7) polystyrenes having molecular weights between 500-8,400,000, manufactured by Tosoh Corporation were used as a molecular weight standard reference material, and
(8) a weight average molecular weight (Mw) and a number average molecular weight (Mn) were obtained as values converted to respective average molecular weights of the above-mentioned polystyrenes, and then, the molecular weight distribution, Mw/Mn (Q value), was obtained.

Example 1

To a 2 liter-volume glass polymerization reactor equipped with a stirrer and a condenser, 1 liter of hexane (polymerization solvent) and 5 mmol of 5-ethylidene-2-norbornene (ENB) were added. Next, ethylene gas, propylene gas and hydrogen (molecular weight regulator) were fed under bubbling from an upper part of the polymerization reactor to said hexane at feeding rates of 4 NL/min., 6 NL/min. and 1 NL/min., respectively, and an internal temperature of the polymerization reactor was regulated at 40° C. with a water bath.

Then, 0.12 mmol of haxachloro-m-xylene (HCX), 0.12 mmol of diethyl adipate, 0.8 mmol of ethylaluminum sesquichloride (EASC) and 0.04 mmol of vanadium oxytrichloride (VOCl$_3$) were added as catalyst components to the polymerization reactor in this order to initiate polymerization.

After 30 minutes from the initiation of the polymerization, 10 ml of methanol containing 0.1 g of 2,6-di-t-butyl-p-cresol (trade name of SUMILIZER BHT, manufactured by Sumitomo Chemical Co., Ltd.) was added to terminate the polymerization. The obtained reaction mixture (copolymer solution) was condensed; the condensed copolymer solution was added to methanol to precipitate the copolymer; and the resultant copolymer was recovered. The obtained copolymer was vacuum dried for 12 hours at 80° C., thereby obtaining 12.0 g of an ethylene-propylene-5-ethylidene-2-norbornene copolymer, which corresponded to 300 g of the copolymer per 1 mmol of VOCl$_3$.

The content of the propylene unit contained in said copolymer, the iodine value thereof and the Q value thereof were 31% by weight, 9 and 3.2, respectively. Results are summarized in Table 1.

Example 2

Example 1 was repeated to obtain the copolymer except that haxachloro-m-xylene and diethyl adipate were mixed preliminarily in a dropping funnel for one minute, and then the obtained mixture was added. Results are summarized in Table 1.

Example 3

Example 1 was repeated to obtain the copolymer except that vanadium oxytrichloride and diethyl adipate were mixed preliminarily in a dropping funnel for one minute, and then the obtained mixture was added. Results are summarized in Table 1.

Comparative Example 1

Example 1 was repeated to obtain the copolymer except that vanadium oxytrichloride, haxachloro-m-xylene and diethyl adipate were mixed preliminarily in a dropping funnel for one minute, and then the obtained mixture was added. Results are summarized in Table 2.

Comparative Example 2

Example 1 was repeated to obtain the copolymer except that (i) vanadium oxytrichloride and haxachloro-m-xylene were mixed preliminarily in a dropping funnel for one minute, and (ii) ethylaluminum sesquichloride and diethyl adipate were mixed preliminarily in another dropping funnel for one minute, and then the obtained respective mixtures were added. Results are summarized in Table 2.

Comparative Example 3

Example 1 was repeated to obtain the copolymer except that vanadium oxytrichloride and haxachloro-m-xylene were mixed preliminarily in a dropping funnel for one minute, and then the obtained mixture was added. Results are summarized in Table 2.

Comparative Example 4

Example 1 was repeated to obtain the copolymer except that ethylaluminum sesquichloride and diethyl adipate were mixed preliminarily in a dropping funnel for one minute, and then the obtained mixture was added. Results are summarized in Table 3.

Comparative Example 5

Example 1 was repeated to obtain the copolymer except that (i) vanadium oxytrichloride and diethyl adipate were mixed preliminarily in a dropping funnel for one minute, and (ii) ethylaluminum sesquichloride and haxachloro-m-xylene were mixed preliminarily in another dropping funnel for one minute, and then the obtained respective mixtures were added. Results are summarized in Table 3.

Comparative Example 6

Example 1 was repeated to obtain the copolymer except that ethylaluminum sesquichloride, haxachloro-m-xylene and diethyl adipate were mixed preliminarily in a dropping funnel for one minute, and then the obtained mixture was added. Results are summarized in Table 3.

Comparative Example 7

Example 1 was repeated to obtain the copolymer except that haxachloro-m-xylene and diethyl adipate were not used. Results are summarized in Table 3.

Example 4

Example 1 was repeated to obtain 16.4 g of an ethylene-propylene-5-ethylidene 2-norbornene copolymer, which corresponded to 410 g of the copolymer per 1 mmol of VOCl$_3$, except that, as catalyst components, 0.12 mmol of ethyl dichlorophenylacetate (EDPA), 0.12 mmol of haxachloro-m-xylene, 0.12 mmol of diethyl adipate, 1.6 mmol of ethylaluminum sesquichloride and 0.04 mmol of vanadium oxytrichloride were added to the polymerization reactor in this order.

The content of the propylene unit contained in said copolymer, the iodine value thereof and the Q value thereof were 35% by weight, 6 and 2.6, respectively. Results are summarized in Table 4.

Comparative Example 8

Example 4 was repeated to obtain the copolymer except that ethyl dichlorophenylacetate was not used. Results are summarized in Table 4.

Comparative Example 9

Example 4 was repeated to obtain the copolymer except that ethyl dichlorophenylacetate and diethyl adipate were not used. Results are summarized in Table 4.

Comparative Example 10

Example 4 was repeated to obtain the copolymer except that diethyl adipate and haxachloro-m-xylene were not used. Results are summarized in Table 4.

Comparative Example 11

Example 4 was repeated to obtain the copolymer except that (i) an amount of ethyl dichlorophenylacetate was changed to 0.24 mmol, and (ii) diethyl adipate and haxachloro-m-xylene were not used. Results are summarized in Table 4.

Comparative Example 12

Example 4 was repeated to obtain the copolymer except that ethyl dichlorophenylacetate, diethyl adipate and haxachloro-m-xylene were not used. Results are summarized in Table 4.

Example 5

Example 1 was repeated to obtain 28.9 g of an ethylene-propylene-5-ethylidene 2-norbornene copolymer, which corresponded to 723 g of the copolymer per 1 mmol of VOCl$_3$, except that (i) as catalyst components, 0.12 mmol of butyl-2-methyl-4,4,4-trichlorobut-2-enoate (BMCB), 0.12 mmol of hexachloro-m-xylene, 0.12 mmol of diethyl adipate, 3.2 mmol of ethylaluminum sesquichloride and 0.04 mmol of vanadium oxytrichloride were added to the polymerization reactor in this order, and (ii) the polymerization temperature was changed to 30□. Results are summarized in Table 5.

Comparative Example 13

Example 5 was repeated to obtain the copolymer except that butyl-2-methyl-4,4,4-trichlorobut-2-enoate was not used. Results are summarized in Table 5.

Comparative Example 14

Example 5 was repeated to obtain the copolymer except that (i) butyl-2-methyl-4,4,4-trichlorobut-2-enoate was used in a double amount, and (ii) diethyl adipate and haxachloro-m-xylene were not used. Results are summarized in Table 5.

Comparative Example 15

Comparative Example 14 was repeated except that (i) butyl-2-methyl-4,4,4-trichlorobut-2-enoate was not used, and (ii) 1.6 mmol of ethylaluminum sesquichloride was used.

TABLE 1

|  | Example | | |
|---|---|---|---|
|  | 1 | 2 | 3 |
| Polymerization temp. (° C.) | 40 | 40 | 40 |
| Feeding rate | | | |
| Ethylene (NL/min) | 4 | 4 | 4 |
| Propylene (NL/min) | 6 | 6 | 6 |
| Hydrogen (NL/min) | 1 | 1 | 1 |
| Addition | | | |
| ENB (mmol) | 5 | 5 | 5 |
| (A) VOCl$_3$ (mmol) | 0.04 | 0.04 | 0.04 |
| (B) EASC (mmol) | 0.8 | 0.8 | 0.8 |
| (C1) HCX (mmol) | 0.12 | 0.12 | 0.12 |
| (D) Diethyl adipate (mmol) | 0.12 | 0.12 | 0.12 |
| Adding method (Note) | A/B/C1/D | A/B/(C1 + D) | (A + D)/B/C1 |
| Copolymer obtained | | | |
| Yield (g/mmol-VOCl$_3$) | 300 | 286 | 263 |
| Propylene unit content (% by weight) | 31 | 33 | 32 |
| Iodine value | 9 | 7 | 10 |
| Q value (Mw/Mn) | 3.2 | 3.6 | 2.5 |
| Mn | 2922 | 2747 | 4080 |
| Mw | 9348 | 9921 | 10300 |

TABLE 2

|  | Comparative Example | | |
|---|---|---|---|
|  | 1 | 2 | 3 |
| Polymerization temp. (° C.) | 40 | 40 | 40 |
| Feeding rate | | | |
| Ethylene (NL/min) | 4 | 4 | 4 |
| Propylene (NL/min) | 6 | 6 | 6 |
| Hydrogen (NL/min) | 1 | 1 | 1 |
| Addition | | | |
| ENB (mmol) | 5 | 5 | 5 |
| (A) VOCl$_3$ (mmol) | 0.04 | 0.04 | 0.04 |
| (B) EASC (mmol) | 0.8 | 0.8 | 0.8 |
| (C1) HCX (mmol) | 0.12 | 0.12 | 0.12 |
| (D) Diethyl adipate (mmol) | 0.12 | 0.12 | 0.12 |
| Adding method (Note) | (A + C1 + D)/B | (A + C1)/(B + D) | (A + C1)/B/D |
| Copolymer obtained | | | |
| Yield (g/mmol-VOCl$_3$) | 211 | 153 | 141 |
| Propylene unit content (% by weight) | 32 | 30 | 29 |
| Iodine value | 11 | 10 | 18 |
| Q value (Mw/Mn) | 3.2 | 4.5 | 3.7 |
| Mn | 2850 | 2042 | 2910 |
| Mw | 9157 | 9256 | 10700 |

TABLE 3

| | Comparative Example | | | |
|---|---|---|---|---|
| | 4 | 5 | 6 | 7 |
| Polymerization temp. (° C.) | 40 | 40 | 40 | 40 |
| Feeding rate | | | | |
| Ethylene (NL/min) | 4 | 4 | 4 | 4 |
| Propylene (NL/min) | 6 | 6 | 6 | 6 |
| Hydrogen (NL/min) | 1 | 1 | 1 | 1 |
| Addition | | | | |
| ENB (mmol) | 5 | 5 | 5 | 5 |
| (A) $VOCl_3$ (mmol) | 0.04 | 0.04 | 0.04 | 0.04 |
| (B) EASC (mmol) | 0.8 | 0.8 | 0.8 | 0.8 |
| (C1) HCX (mmol) | 0.12 | 0.12 | 0.12 | — |
| (D) Diethyl adipate (mmol) | 0.12 | 0.12 | 0.12 | — |
| Adding method (Note) | A/(B + D)/C1 | (A + D)/(B + C1) | A/(B + C1 + D) | A/B |
| Copolymer obtained | | | | |
| Yield (g/mmol-$VOCl_3$) | 118 | 54 | 19 | 27 |
| Propylene unit content (% by weight) | 31 | 22 | — | 12 |
| Iodine value | 21 | 21 | 6 | 16 |
| Q value (Mw/Mn) | 2.5 | 3.6 | 3.5 | 3.0 |
| Mn | 2920 | 2747 | 421 | 705 |
| Mw | 7360 | 9921 | 1455 | 2098 |

Note
The adding method of "A/B/C1/D" in Table 1 means that the respective components (A) to (D) were added without pre-contacting them. The adding method such as "A/B/(C1 + D)" in Tables 1 to 3 means that, for example, the respective components (A) and (B) were added without pre-contacting them, and the components (C1) and (D) were pre-contacted at room temperature to obtain a mixture, and then the obtained mixture was added, wherein the adding methods used in Comparative Examples 1 to 4 are those disclosed in the above-mentioned JP 07-048412 A.

TABLE 4

| | | Comparative Example | | | | |
|---|---|---|---|---|---|---|
| | Example 4 | 8 | 9 | 10 | 11 | 12 |
| Polymerization temp. (° C.) | 40 | 40 | 40 | 40 | 40 | 40 |
| Feeding rate | | | | | | |
| Ethylene (NL/min) | 4 | 4 | 4 | 4 | 4 | 4 |
| Propylene (NL/min) | 6 | 6 | 6 | 6 | 6 | 6 |
| Hydrogen (NL/min) | 1 | 1 | 1 | 1 | 1 | 1 |
| Addition | | | | | | |
| ENB (mmol) | 5 | 5 | 5 | 5 | 5 | 5 |
| (A) $VOCl_3$ (mmol) | 0.04 | 0.04 | 0.04 | 0.04 | 0.04 | 0.04 |
| (B) EASC (mmol) | 1.6 | 1.6 | 1.6 | 1.6 | 1.6 | 1.6 |
| (C2) EDPA (mmol) | 0.12 | — | — | 0.12 | 0.24 | — |
| (C3) HCX (mmol) | 0.12 | 0.12 | 0.12 | — | — | — |
| (D) Diethyl adipate (mmol) | 0.12 | 0.12 | — | — | — | — |
| Copolymer obtained | | | | | | |
| Yield (g/mmol-$VOCl_3$) | 410 | 261 | 89 | 127 | 243 | 27 |
| Propylene unit content (% by weight) | 35 | 32 | 28 | 30 | 40 | 12 |
| Iodine value | 6 | 10 | 14 | 16 | 14 | 16 |
| Q value (Mw/Mn) | 2.6 | 3.0 | 3.6 | 3.5 | 2.7 | 3.0 |
| Mn | 2074 | 2474 | 1580 | 1252 | 1478 | 705 |
| Mw | 5493 | 7491 | 5719 | 4395 | 4015 | 2098 |

TABLE 5

| | | Comparative Example | | |
|---|---|---|---|---|
| | Example 5 | 13 | 14 | 15 |
| Polymerization temp.(° C.) | 30 | 30 | 30 | 30 |
| Feeding rate | | | | |
| Ethylene (NL/min) | 4 | 4 | 4 | 4 |
| Propylene (NL/min) | 6 | 6 | 6 | 6 |
| Hydrogen (NL/min) | 1 | 1 | 1 | 1 |
| Addition | | | | |
| ENB (mmol) | 5 | 5 | 5 | 5 |
| (A) $VOCl_3$ (mmol) | 0.04 | 0.04 | 0.04 | 0.04 |
| (B) EASC (mmol) | 3.2 | 3.2 | 3.2 | 1.6 |
| (C4) BMCB (mmol) | 0.12 | — | 0.24 | — |
| (C3) HCX (mmol) | 0.12 | 0.12 | — | — |
| (D) Diethyl adipate (mmol) | 0.12 | 0.12 | — | — |
| Copolymer obtained | | | | |
| Yield (g/mmol-$VOCl_3$) | 723 | 462 | 559 | 45 |
| Propylene unit content (% by weight) | 38 | 35 | 42 | 30 |
| Iodine value | 4 | 6 | 7 | 20 |
| Q value (Mw/Mn) | 2.8 | 2.5 | 2.4 | 3.3 |
| Mn | 4560 | 4606 | 2610 | 2299 |
| Mw | 14240 | 11307 | 6215 | 7538 |

From the above, it can easily be understood that the process in accordance with the present invention gives a copolymer with a higher catalytic activity than that in JP 07-048412 A.

The invention claimed is:

1. A process for producing a copolymer of ethylene, an α-olefin having from 3 to 20 carbon atoms and optionally a polyene, which comprises the step of copolymerizing in a polymerization reactor ethylene, the α-olefin having from 3 to 20 carbon atoms and optionally the polyene by feeding to the polymerization reactor:

(A) a transition metal complex, (B) an organic aluminum compound, (C2) a halogen-containing compound, which is a derivative of an aryl group-containing carboxylic acid, (C3) a halogen-containing compound, which is not a derivative of a carboxylic acid, and (D) a Lewis base.

2. The process according to claim 1, wherein the halogen-containing compound (C2) is a halogen-containing compound, which is a derivative of an aryl group-containing carboxylic acid, wherein the halogen atom is linked to a carbon atom linked to both a carbonyl group and the aryl group.

3. The process according to claim 1, wherein the halogen-containing compound (C3) is a halogen-containing compound, which:

(1) is not a derivative of a carboxylic acid, (2) belongs to a halogen-containing compound, wherein the halogen atom is linked (i) to a π electron-carrying carbon atom, or (ii) to a carbon atom linked to a π electron-carrying carbon atom, and (3) does not have a bond between a hetero atom and a carbon atom of a carbonyl group.

4. The process according to claim 1, wherein the halogen-containing compound (C2) is a compound represented by the following formula (4),

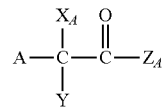
(4)

wherein A is an aryl group; $X_A$ is a halogen atom; Y is a halogen atom, a hydrogen atom or a substituent group having no active hydrogen; and $Z_A$ is a halogen atom, an alkoxy group, a hydroxyl group or an amino group.

5. The process according to claim 1, wherein the transition metal complex (A) is a vanadium compound represented by the following formula (1) or (2):

$$VO(OR)_a Cl_{3-a} \qquad (1)$$

$$VX_b \qquad (2)$$

wherein R in the formula (1) is a hydrocarbon group, and "a" therein is a number satisfying $0 \leq a \leq 3$; and X in the formula (2) is a halogen atom or an oxygen-containing compound capable of being a ligand, and "b" therein is 3 or 4.

6. The process according to claim 1, wherein (i) the transition metal complex (A) is a vanadium compound represented by the following formula (1) or (2):

$$VO(OR)_a Cl_{3-a} \qquad (1)$$

$$VX_b \qquad (2)$$

wherein R in the formula (1) is a hydrocarbon group, and "a" therein is a number satisfying $0 \leq a \leq 3$; and X in the formula (2) is a halogen atom or an oxygen-containing compound capable of being a ligand, and "b" therein is 3 or 4, and (ii) the organic aluminum compound (B) is an organic aluminum compound represented by the following formula (3):

$$E_a AlZ_{3-a} \qquad (3)$$

wherein E is a hydrocarbon group; Z is a hydrogen atom or a halogen atom; and "a" is a number satisfying $0 < a \leq 3$.

* * * * *